(12) United States Patent
Christensen et al.

(10) Patent No.: US 6,681,249 B2
(45) Date of Patent: Jan. 20, 2004

(54) DYNAMICALLY ADAPTIVE NETWORK ELEMENT TELEMETRY SYSTEM

(75) Inventors: Loren Christensen, Manotick (CA); Bogdan Materna, Ottawa (CA)

(73) Assignee: Linmor Inc., Ottawa (CA)

( * ) Notice: Subject to any disclaimer, the term of this patent is extended or adjusted under 35 U.S.C. 154(b) by 45 days.

(21) Appl. No.: 09/843,488

(22) Filed: Apr. 26, 2001

(65) Prior Publication Data

US 2002/0112053 A1 Aug. 15, 2002

(30) Foreign Application Priority Data

Feb. 15, 2001 (CA) ............................................ 2337292

(51) Int. Cl.$^7$ .......................................... G06F 15/173
(52) U.S. Cl. ....................... 709/224; 709/223; 709/226; 709/227; 709/228
(58) Field of Search ................................ 709/224, 223, 709/226, 227, 228

(56) References Cited

U.S. PATENT DOCUMENTS

| | | | | |
|---|---|---|---|---|
| 5,262,771 A | * | 11/1993 | Herrmann et al. | 340/3.31 |
| 5,274,367 A | * | 12/1993 | Herrmann et al. | 340/3.43 |
| 6,055,493 A | * | 4/2000 | Ries et al. | 702/186 |
| 6,061,724 A | * | 5/2000 | Ries et al. | 709/224 |

OTHER PUBLICATIONS

V. Catania, et al., Monitoring Performance In Distributed Systems, Computer Communications 19 (1996), pp. 188–803.*

D. Gavalas, et al., Advanced Network Monitoring Applications Based On Mobile/Intelligent Agent Technology, Computer Communications 23 (2000), pp. 720–730.*

* cited by examiner

Primary Examiner—Ario Etienne
Assistant Examiner—La Shonda Jacobs
(74) Attorney, Agent, or Firm—Pearne & Gordon LLP

(57) ABSTRACT

A dynamically adaptive network element telemetry system, leveraging the functionality of a high speed communications network comprising a network element telemetry infrastructure comprised of at least one Performance Monitor (PM) server computer and at least one, and preferably a plurality of Data Collection (DC) node computers comprising a Data Collection Process (DCP) comprising a command handler. The system further comprises a Single Distributed Arena (SDA) encompassing the network element telemetry infrastructure to form a single large parallel virtual application wherein the DCP further comprises a run time telemetry parameter operational change application. The SDA further comprises a telemetry control and collected data filter application providing the primary interface between the DCP and the SDA and a performance telemetry controller to enable the suspension, resumption or change of the parameters of performance telemetry for any network element.

24 Claims, 3 Drawing Sheets

DYNAMICALLY ADAPTIVE NETWORK ELEMENT TELEMETRY SYSTEM

FIELD OF THE INVENTION

The present invention relates to the monitoring of network elements comprising a high speed managed data network, and more particularly to a dynamically adaptive network element telemetry system.

BACKGROUND OF THE INVENTION

A network needs to be monitored for the existence, disappearance, reappearance and status of traditional network devices such as routers, hubs and bridges and more recently high speed switching devices such as ATM, Frame Relay, DSL, VoIP and Cable Modems.

In order to generate meaningful performance reports a network management system is required to collect and process primarily two types of data. Network Topology Data and Performance Data. Network Topology Data defines what each object is and where it is located in the network hierarchy, while Performance Data are scalar values representing the management variable for each object at specified time intervals, Network monitoring is traditionally achieved through the polling of the elements. A typical initial installation configuration of a management system known in the art results in the network element polling rate being set at a fixed default level, typically 15 minutes. With the timing of samples and delays associated with data processing, this results in the management system being able to generate reports within a couple of polling cycles.

Periodically, there is a need to increase this default polling rate by decreasing the polling interval on specific network elements to allow for closer scrutiny of the network under management. The problem is that most existing systems are unable to change polling parameters "on-the-fly". Instead, it has been necessary to perform labourious manipulations for each desired change, followed by a disruption of polling activity to allow for the transmission of the resulting changes, and finally having to wait for a couple of polling cycles to occur in order to generate reports based on the changes.

This results in delays in the availability of information, delays typically in excess of the time this information is required. The solution to this problem therefore, must comprise a method for rapidly modifying not only the polling rate of specific elements, but any operational parameter required for network telemetry such as a fall back parameter that controls the retry behaviour of a transaction that fails due to network congestion.

For the foregoing reasons, there is a need for a method of network element telemetry that provides for the localized, low-latency re-configuration and reporting of monitoring transactions without a disruption of polling activity.

SUMMARY OF THE INVENTION

The present invention is directed to a dynamically adaptive network element telemetry system that satisfies this need. The system, leveraging the functionality of a high speed communications network comprising a network element telemetry infrastructure comprised of at least one Performance Monitor (PM) server computer and at least one, and preferably a plurality of Data Collection (DC) node computers comprising a Data Collection Process (DCP) comprising a command handler, the system further comprises a Single Distributed Arena (SDA) encompassing the network element telemetry infrastructure to form a single large parallel virtual application wherein the DCP further comprises a run time telemetry parameter operational change application. The SDA further comprises a telemetry control and collected data filter application providing the primary interface between the DCP and the SDA and a performance telemetry controller to enable the suspension, resumption or change of the parameters of performance telemetry for any network element.

In an aspect of the invention, there is a defined maximum interval of time for which any element can be fast-polled more often than the default rate. At programmed intervals the server will traverse the list of known network elements and any elements that have been polled longer than permissible will be restored to the background rate. Permissible time is calculated from the first rate change request and is not reset for subsequent requests.

In an aspect of the invention, limits on the number of concurrent fast-polls per managed device is enforced.

In an aspect of the invention, provision is made in the protocol for clients to specify formulae containing more than one telemetric parameter. This allows a client to monitor more than one separately generated statistic derived from data received in the same probe to minimize measurement traffic to the managed device.

As well, measurement traffic to the managed device is not increased with additional subscribing clients on the same element since these additional clients get their information from the same data stream.

The invention provides for more granular monitoring of identified trouble spots in the network than that under the default background polling rate and without a disruption of polling activity. By enabling the user to increase the frequency of polling for specific network elements, more information can be generated over a shorter period of time relating to what is happening.

Near real-time access to the management telemetry stream provides the user with a tight watch on possible troubled areas of the network by making increased telemetry available for any managed element that the system has flagged as performing outside the normative range.

The invention enables rapid and dynamic control of the operational parameters of management transactions conducted by the DC node computer on behalf of the PM server computer.

As well, the invention safeguards against over-management of delicate or heavily loaded devices.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

Figure 1:
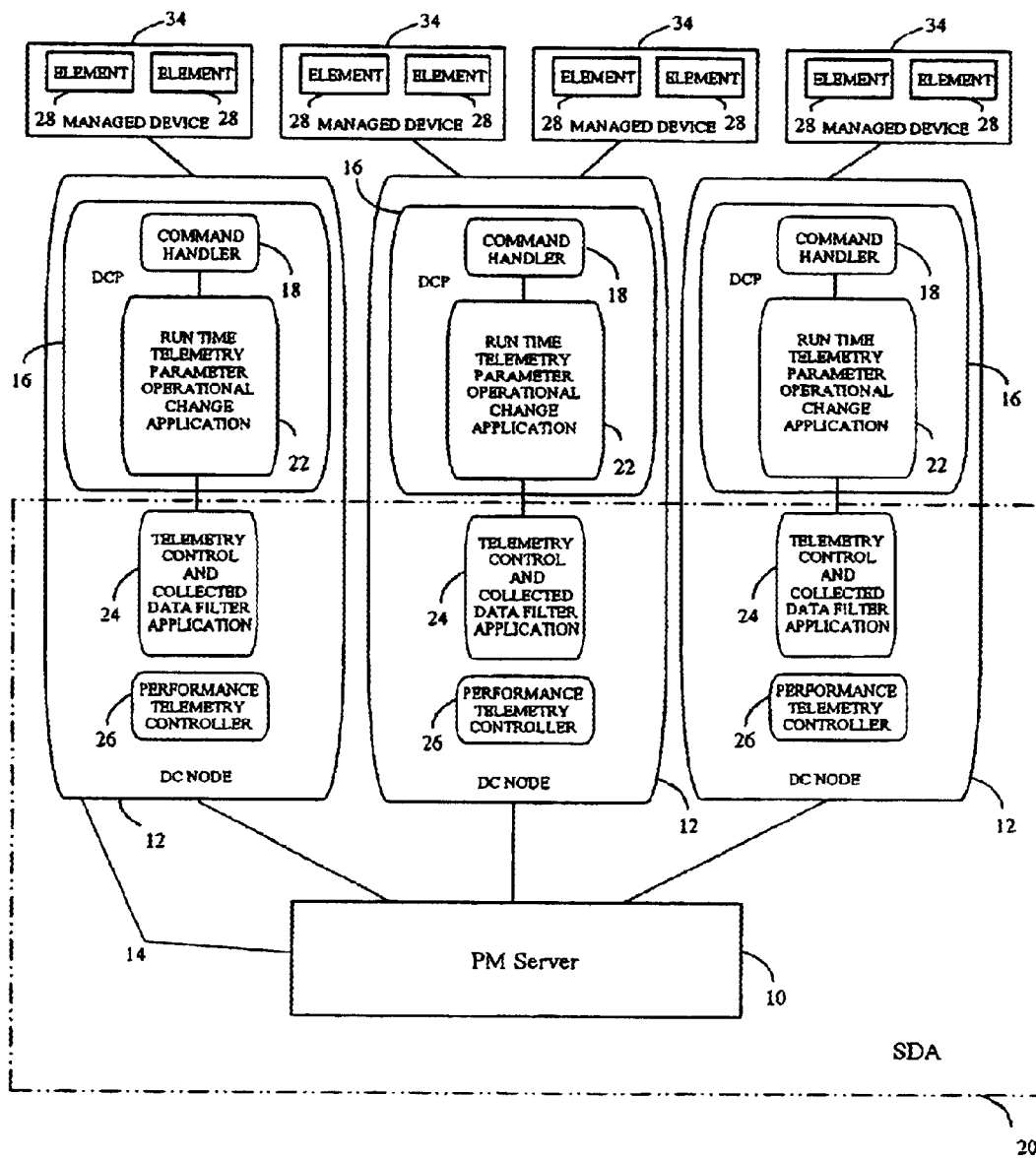
FIG. 1 is an overview of the dynamically adaptive network element telemetry system.

As shown in FIG. 1, the present invention is directed to a dynamically adaptive network element telemetry system. The system, leveraging the functionality of a high speed communications network comprising a network element telemetry infrastructure comprised of at least one Performance Monitor (PM) server computer 10 and at least one, and preferably a plurality of Data Collection (DC) node computers 12 comprising a Data Collection Process (DCP) 16 comprising a command handler 18. The system further comprises a Single Distributed Arena (SDA) 20 encompassing the network element telemetry infrastructure 14 to form a single large parallel virtual application wherein the DCP 16 further comprises a run time telemetry parameter operational change application 22. The SDA 20 further comprises a telemetry control and collected data filter application 24 providing the primary interface between the DCP 16 and the SDA 20 and a performance telemetry controller 26 to enable the suspension, resumption or change of the parameters of performance telemetry for any network element 28.

The SDA 20 is embodied in a software application that permits a heterogeneous collection of computers to be combined for use as a single large parallel virtual application.

The SDA 20 provides an environment whereby the PM server computer 10 and the DC node computers 12 can establish communications in a way that does not affect the normal flow of information between them during polling rate changes.

Figure 2:
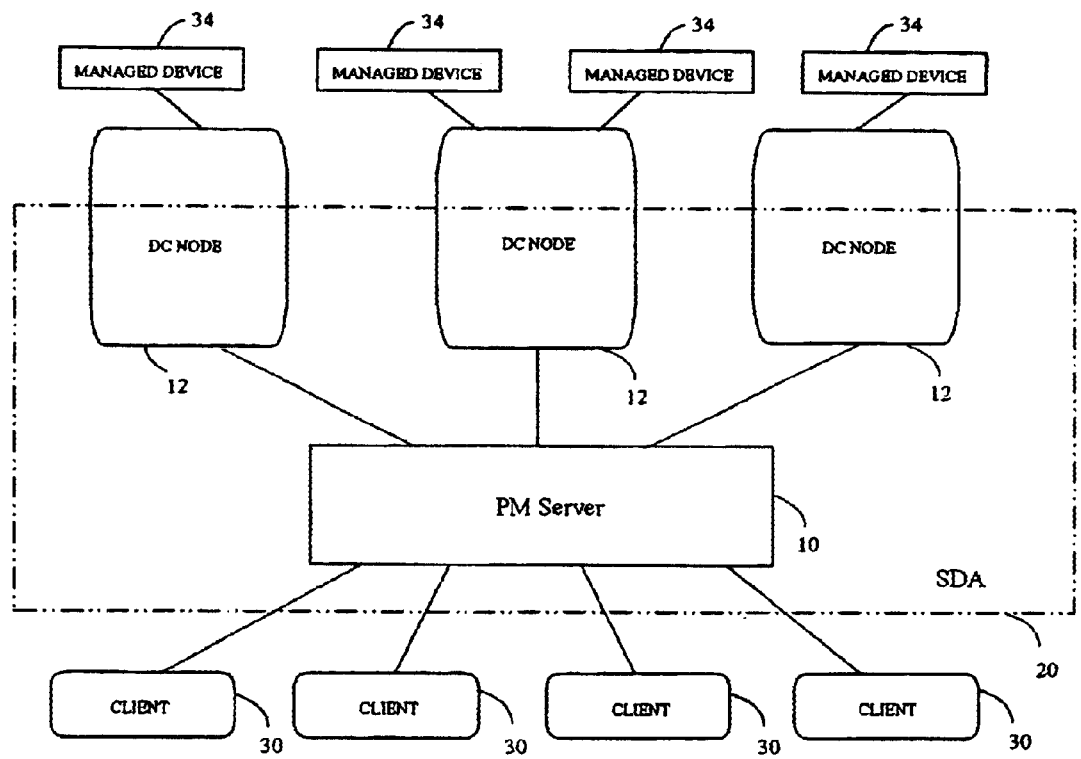
FIG. 2 shows client computers connected to the network.

As shown in FIG. 2, in preferred embodiments of the invention, the system further comprises at least one client computer 30 connected to the network to communicate remotely with the PM server computer 10 to initiate and view telemetry changes.

A client application 30 specifies a desired polling rate in its initial subscription message. If the client 30 requests the default background polling rate it will receive updates at the current normative frequency and no rate adjustment functions occur.

If a client 30 requests a rate faster than the default the system checks the normative rate for the element 28 requested. If required and permissible, a rate adjustment message is dispatched to the responsible control filter 24 in its DC node computer 12.

In an embodiment of the invention, a provided 'suspend or restore telemetry for an element command 32 provides suspension and restoration functionality which causes the process to stop or resume performance telemetry to an element 28 given by name as well as any existing sub-elements. This functionality is automatic, therefor no response is required from either the user or the system. To receive confirmation, the user reads back the normative configuration using the report command. State rules are not affected by a suspension.

To avoid over-management the invention provides certain safeguards against unacceptably aggressive polling of a managed device 34.

Figure 3:
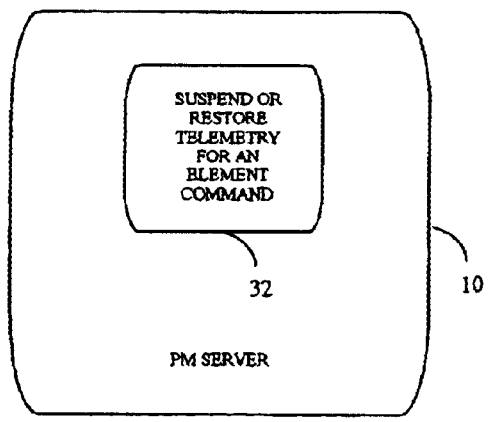
FIG. 3 shows the suspend or restore telemetry for an element command.

As shown in FIG. 3, in an embodiment of the invention, the system is further comprised of a fast-poll duration limiter 36 for defining a maximum interval of time for which any element 28 can be polled more often than the default rate or 'fast-polled'. At programmed intervals the system will traverse the list of known elements 28 and any elements 28 that have been polled longer than permissible will be restored to the background rate. This permissible time is calculated from the first rate change request and is not reset for subsequent requests.

Figure 4:
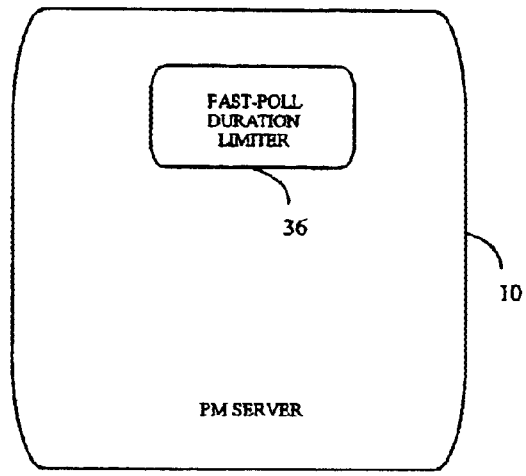
FIG. 4 shows the fast-poll duration limiter.

As well, as shown in FIG. 4, in an embodiment of the invention, the system is further comprised of a fast-poll concurrency limiter 38 for enforcing a maximum number of concurrent fast-polls per device 34. Concurrent fast polls are defined as fast polls occurring at the same time.

Policing this constraint is delegated to the control filter 24 which internally tracks the number of fast-polls scheduled for each managed device 34. Once the limit has been reached on a device 34 the filter 24 will balk at attempts to schedule additional elements 28 of the device 34 for fast-polling.

When the system determines that there are no remaining fast-polling clients 30 subscribed for a particular device 34, a default rate control message is sent to the responsible control filter 24. For this determination the system only considers whether it has an known active fast-polling client 30 for the device 34. Whether or not a client 30 has signed off gracefully is not considered in order to ensure that fast-polling will not be conducted unnecessarily.

The invention is designed to handle the considerable application and measurement traffic that can be generated. Data from the DCP 16 is filtered at the DC node computer 12 using efficient hashing algorithms to ensure that only client 30 requested data is released into the management band. No double polling is done, the data the near real-time client 30 sees is obtained from the same management transaction that feeds the reporting database.

Dynamic control of polling parameters is achieved by modifying the DCP 16 to allow for runtime variations of the operational parameters without a disruption of polling activity.

The command handlers 18 within the DCP 16 include functionality to recognize a listen class command to adjust the poll rate of a given element 28. This command takes effect unequivocally.

As well, a provided 'report telemetry parameters' command causes the DCP 16 to report the telemetry parameters of any element 28 given by name. The response will be either a list of probe configuration data or an assertion that the element 28 is not known at this DCP 16.

Communication between the PM server computer 10 and its DC node computers 12 is accomplished via Internet Datagram Sockets using an expression interpreter embedded in the system.

Client computer 30 tasks communicate with the system via a lightweight datagram-based protocol. The DCP 16 uses the User Datagram Protocol (UDP) to the end client 30 thereby providing scalability, simplicity and speed. UTP has always been an excellent choice when an extremely large client base must be kept very up-to-date with data whose currency is transient by nature. The client 30 protocol that is overlaid onto the UDP is correspondingly lightweight and tolerant of disruption.

Status history is sent with each client 30 update so that the UDP server need only emit packets when new data is available. Even with this history information included the packet size is small, typically less than 512 bytes.

An indefinite number of clients 30 can be actively receiving processed telemetry at any given time. In embodiments of the invention, provision is made for specialized control clients that are intended as integration hooks for non-SDA applications.

The invention provides for more granular monitoring of identified trouble spots in the network than that under the default background polling rate and without a disruption of polling activity. By enabling the user to increase the frequency of polling for specific network elements 28 more information can be generated over a shorter period of time relating to what is happening.

Near real-time access to the management telemetry stream provides the user with a tight watch on those identified troubled areas of the network by making increased telemetry available for any managed element 28 that the system has flagged as performing outside of its normative range.

The invention allows rapid and dynamic control of the operational parameters of management transactions conducted by the DC node computer 12 on behalf of the PM server computer 10.

As well, the invention safeguards against overmanagement of delicate or heavily loaded devices.

Collected data can be filtered, processed and transported to a web-based or other client 30 at a much faster rate.

Measurement traffic to the managed device 34 is not increased with additional subscribing clients 30 on the same element 28 since these additional clients 30 get their information from the same data stream.

Easily understood message/reply sets make the system extremely portable. Any system or language that as bindings to open an Internet Datagram Socket, or can proxy one, can have a client 30. Foreign systems can integrate either with the SDA 20 control system or at the UDP client 30 level.

The design is simple to maintain and horizontally scalable to an arbitrary degree.

Figure 5:
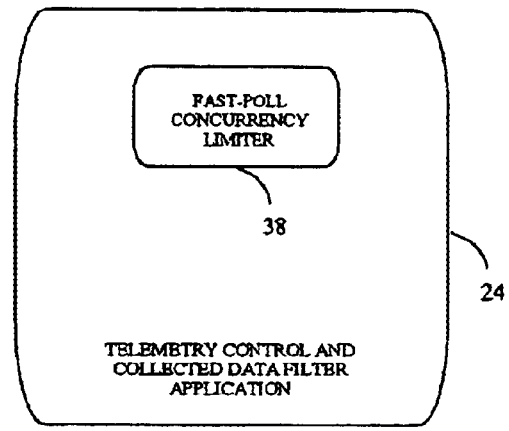
FIG. 5 shows the fast-poll concurrency limiter.

As shown in FIG. 5, in an embodiment of the invention, provision is made in the protocol for clients 30 to specify formulae 40 containing more than one telemetric parameter 42. This allows a client 30 to monitor more than one separately generated statistic derived from data received in the same probe to minimize measurement traffic to the managed device 34.

Figure 6:
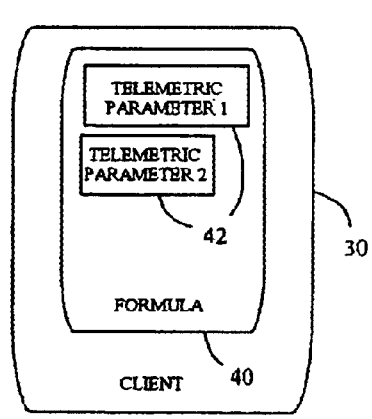
FIG. 6 shows the client specifying formulae containing more than one telemetric parameter.
Figure 7:
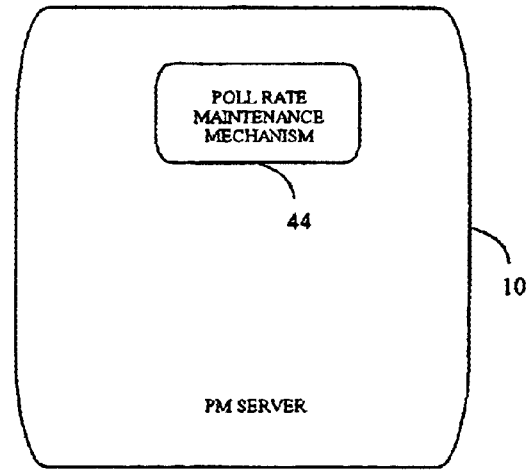
FIG. 7 shows the poll rate maintenance mechanism.

As shown in FIG. 6, in another embodiment of the invention, a poll rate maintenance mechanism 44 is provided as an error feedback control scheme. The collection time associated with each sample received from a control filter 24 is examined and the effective polling rate is calculated. This measured value is compared against the normative rate for the implicated element 28. If the measurement does not conform to the normative rate for the element 28 additional rate change commands are sent to the control filter 24 to bring the rate in line. Since the measured rate will rarely be exactly equal to the normative rate the feedback control scheme uses a heuristic formula to determine if the rate is close enough. Changes to the normative polling rate are naturally enforced as the system continually seeks equilibrium.

Although the present invention has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A dynamically adaptive network element telemetry system, leveraging the functionality of a high speed communications network comprising a network element telemetry infrastructure comprised of at least one Performance Monitor (PM) server computer and at least one, and preferably a plurality of Data Collection (DC) node computers comprising a Data Collection Process (DCP) comprising a command handler, the system further comprising:

a Single Distributed Arena (SDA) encompassing the network element telemetry infrastructure to form a single large parallel virtual application wherein the DCP further comprises a run time telemetry parameter operational change application, the SDA farther comprising;

a telemetry control and collected data filter application providing the primary interface between the DCP and the SDA; and a performance telemetry controller to enable the suspension, resumption or change of the parameters of performance telemetry for any network element.

2. The system according to claim 1, further comprising at least one client computer connected to the network to communicate remotely with the PM server computer to initiate and view telemetry changes.

3. The system according to claim 1, further comprising a fast-poll concurrency limiter for enforcing a maximum number of concurrent fast-polls per device to reduce overpolling.

4. The system according to claim 1, further comprising a fast-poll duration limiter for defining a maximum interval of time for which any element can be polled more often than the default rate or 'fast-polled'.

5. The system according to claim 1, further comprising formulae comprised of more than one telemetric parameter to allow a client computer to monitor more than one separately generated statistic derived from data received in the same probe to minimize measurement traffic to the managed device.

6. The system according to claim 1, further comprising a poll rate maintenance mechanism for poll rate error feedback control.

7. A dynamically adaptive network element telemetry method, leveraging the functionality of a high speed communications network comprising a network element telemetry infrastructure comprised of at least one Performance Monitor (PM) server computer and at least one, and preferably a plurality of Data Collection (DC) node computers comprising a Data Collection Process (DCP) comprising a command handler, the method further comprising the steps of:

(i) encompassing the network element telemetry infrastructure employing a Single Distributed Arena (SDA) to form a single large parallel virtual application wherein the DCP further comprises a run time telemetry parameter operational change application, the encompassing step further comprising the steps of:

a) providing the primary interface between the DCP and the SDA using a telemetry control and collected data filter application; and b) enabling the suspension, resumption or change of the parameters of performance telemetry for any network element using a performance telemetry controller.

8. The method according to claim 7, further comprising the step of communicating remotely with the PM server computer to initiate and view telemetry changes using at least one client computer connected to the network.

9. The method according to claim 7, further comprising the step of enforcing a maximum number of concurrent fast-polls per device to reduce over-polling.

10. The system according to claim 7, further comprising the step of enforcing a maximum interval of time for which any element can be fast-polled to reduce over-polling.

11. The method according to claim 7, further comprising specifying formulae comprised of more than one telemetric parameter to allow a client computer to monitor more than one separately generated statistic derived from data received in the same probe to minimize measurement traffic to the managed device.

12. The method according to claim 7, further comprising controlling poll rate error feedback employing a poll rate maintenance mechanism.

13. A dynamically adaptive network element telemetry system, leveraging the functionality of a high speed communications network comprising a network element telemetry infrastructure comprised of at least one Performance Monitor (PM) server computer and at least one, and preferably a plurality of Data Collection (DC) node computers comprising a Data Collection Process (DCP) comprising a command handler, the system further comprising:

means for encompassing the network element telemetry infrastructure employing a Single Distributed Area (SDA) to form a single large parallel virtual application wherein the DCP further comprises a run time telemetry parameter operational change application, the means for encompassing further comprising:

means for providing the primary interface between the DCP and the SDA using a telemetry control and collected data filter application; and means for enabling the suspension, resumption or change of the parameters of performance telemetry for any network element using a performance telemetry controller.

14. The system according to claim 13, further comprising means for communicating remotely with the PM server computer to initiate and view telemetry changes using at least one client computer connected to the network.

15. The system according to claim 13, further comprising means for enforcing a maximum number of concurrent fast-polls per device to reduce over-polling.

16. The system according to claim 13, further comprising the step of enforcing a maximum interval of time for which any element can be fast-polled to reduce over-polling.

17. The system according to claim 13, further comprising means for specifying formulae comprised of more than one telemetric parameter to allow a client computer to monitor more than one separately generated statistic derived from data received in the same probe to minimize measurement traffic to the managed device.

18. The system according to claim 13, further comprising means for controlling poll rate error feedback employing a poll rate maintenance mechanism.

19. A storage medium readable by an install server computer in a dynamically adaptive network element telemetry system, leveraging the functionality of a high speed communications network comprising a network element telemetry infrastructure comprised of at least one Performance Monitor (PM) server computer and at least one, and preferably a plurality of Data Collection (DC) node computers comprising a Data Collection Process (DCP) comprising a command handler, the storage medium encoding a computer process comprising:

a processing portion for encompassing the network element telemetry infrastructure employing a Single Distributed Arena (SDA) to form a single large parallel virtual application wherein the DCP further comprises a run time telemetry parameter operational change application, the encompassing portion further comprising:

processing portion for providing the primary interface between the DCP and the SDA using a telemetry control and collected data filter application; and a processing portion for enabling the suspension, resumption or change of the parameters of performance telemetry for any network element using a performance telemetry controller.

20. The system according to claim 19, further comprising a processing portion for communicating remotely with the PM server computer to initiate and view telemetry changes using at least one client computer connected to the network.

21. The system according to claim 19, further comprising a processing portion for enforcing a maximum number of concurrent fast-polls per device to reduce over-polling.

22. The system according to claim 19, further comprising a processing portion for enforcing a maximum interval of time for which any element can be fast-polled to reduce over-polling.

23. The system according to claim 19, further comprising a processing portion for specifying formulae comprised of more than one telemetric parameter to allow a client computer to monitor more than one separately generated statistic derived from data received in the same probe to minimize measurement traffic to the managed device.

24. The system according to claim 19, further comprising a processing portion for controlling poll rate error feedback employing a poll rate maintenance mechanism.

\* \* \* \* \*

UNITED STATES PATENT AND TRADEMARK OFFICE
CERTIFICATE OF CORRECTION

PATENT NO. : 6,681,249 B2
DATED : January 20, 2004
INVENTOR(S) : Loren Christensen et al.

It is certified that error appears in the above-identified patent and that said Letters Patent is hereby corrected as shown below:

Column 1,
Line 26, please delete "," (comma), and insert therefor -- . -- (period).

Column 5,
Line 27, please delete "as", and insert therefor -- has --.

Column 8,
Line 23, before "processing", please insert -- a --.

Signed and Sealed this

Fifteenth Day of June, 2004

JON W. DUDAS
*Acting Director of the United States Patent and Trademark Office*